(12) United States Patent
Brennan et al.

(10) Patent No.: US 7,774,292 B2
(45) Date of Patent: Aug. 10, 2010

(54) SYSTEM FOR CONDITIONAL ANSWERING OF REQUESTS

(75) Inventors: Christopher Brennan, Northridge, CA (US); Aaron Joseph McBride, Calabasas, CA (US); Robert Rappaport, Malibu, CA (US); Jeremy Romero, Calabasas, CA (US); Robert W. Williams, Pacific Palisades, CA (US)

(73) Assignee: Conversive, Inc., Malibu, CA (US)

( * ) Notice: Subject to any disclaimer, the term of this patent is extended or adjusted under 35 U.S.C. 154(b) by 365 days.

(21) Appl. No.: 10/984,362

(22) Filed: Nov. 9, 2004

(65) Prior Publication Data

US 2005/0125370 A1    Jun. 9, 2005

Related U.S. Application Data

(60) Provisional application No. 60/518,709, filed on Nov. 10, 2003.

(51) Int. Cl.
 *G06N 5/02* (2006.01)
(52) U.S. Cl. .............................. 706/47; 704/9; 704/270; 704/275
(58) Field of Classification Search ................... 706/47; 704/9, 270, 275
See application file for complete search history.

(56) References Cited

U.S. PATENT DOCUMENTS

| | | | |
|---|---|---|---|
| 6,102,969 A * | 8/2000 | Christianson et al. ....... | 717/146 |
| 6,259,969 B1 * | 7/2001 | Tackett et al. ............... | 700/264 |
| 6,314,410 B1 * | 11/2001 | Tackett et al. ................ | 706/11 |
| 6,363,301 B1 * | 3/2002 | Tackett et al. ............... | 700/246 |
| 6,532,401 B2 * | 3/2003 | Tackett et al. ............... | 700/245 |
| 6,604,090 B1 * | 8/2003 | Tackett et al. ................ | 706/11 |
| 6,629,087 B1 * | 9/2003 | Tackett et al. ................ | 706/11 |
| 6,754,647 B1 * | 6/2004 | Tackett et al. ................ | 706/52 |
| 2002/0133504 A1 * | 9/2002 | Vlahos et al. ............. | 707/104.1 |
| 2002/0156551 A1 * | 10/2002 | Tackett et al. ............... | 700/245 |
| 2003/0074471 A1 * | 4/2003 | Anderson et al. ........... | 709/245 |

* cited by examiner

*Primary Examiner*—Donald Sparks
*Assistant Examiner*—Mai T Tran
(74) *Attorney, Agent, or Firm*—The Webb Law Firm (57) ABSTRACT

Disclosed is a method and system for the use of virtual robots (Bots) to assist in the answering of inquiries from persons over the Internet, telephone, wireless, or other form of electrical, digital, or electronic communication. Such method and system consists of (1) a Bot processor consisting of (a) a connection interface capable of receiving, directly or indirectly, inputs from a user in natural or machine language, which the Bot processor then responds to in natural or machine language, and (b) an engine capable of recognizing an input and providing a response; and (2) a service desk consisting of (a) a human being, (b) a connection interface that connects directly or indirectly to the Bot processor and to the front end, and (c) a display where the human being can see, in humanly comprehensible form, information transmitted by the user and/or the Bot processor.

12 Claims, 5 Drawing Sheets

SYSTEM FOR CONDITIONAL ANSWERING OF REQUESTS

CROSS-REFERENCE TO RELATED APPLICATIONS

This application claims the benefit of U.S. Provisional Patent Application Ser. No. 60/518,709, filed Nov. 10, 2003.

BACKGROUND OF THE INVENTION

1. Field of the Invention

The present invention is directed to a method and system for the use of virtual robots ("Bots") to autonomously process inputs and to assist human beings in processing inputs. More particularly, the present invention is directed to a method and system for the automated, conditional answering of requests by a Bot, where the Bot acts directly on inputs and sends a proposed response to the input to a human being for approval.

2. Description of Related Art

For the purposes of the present invention, "virtual robots" (or "Bots") are software programs that interact and/or communicate with users (human, machine or otherwise) and that take actions or make responses according to input from these users. A common use of such a Bot is an interface to a web site wherein the administrator of that site (the "administrator") has programmed the Bot to answer simple inquiries that are typically asked by visitors to the site. A preferred embodiment of the above identified application discloses a method of creating Bots according to "patterns", that is text strings that are written in a very high level language that closely resembles a human natural language and intended to anticipate the inputs that may be received from users. In this context, "input" refers to any description of a situation the Bot may encounter; although the most common inputs are textual inputs from users, inputs can be actions taken by users, external circumstances, or even events internal to the Bot such as an internal alarm clock (the "input"). The Bot finds the pattern that best matches the input, and then takes the action that it is programmed to take in connection with that pattern (the "response"). The response can take the form of a text string that contains the information sought by the user (which text string can be transmitted to the user in text form, "read" by a text-to-speech engine, played back to the user as a wave file, or otherwise transmitted to the user in a humanly comprehensible form) or the response can be any other action of which a program is capable, for example, bringing a web page, turning a circuit on or off, initiating or ending a program, etc.

It is desirable for the Bot to be scripted to anticipate the inputs that it is likely to receive and the situations that it is likely to encounter. Because users may ask questions or otherwise create inputs in a wide variety of different ways, a large variety of patterns is required to comprehensively anticipate the variety of inputs that the Bot may receive. This complexity is greatly increased by the number of different ways a user may create any particular input. For example, if a user wants to know the name of the president of the administrator's company, the user may input text string reading "Who is your President?", "What's the President's name?" or even "Who's the top dog at AdminCo.?"

Historically, Bots have been used only to respond directly to Users. This is effective in many situations, but has a certain number of drawbacks as well. For example, companies may be uncertain whether the Bot is really adequately scripted to answer everything that a User may ask it, and may therefore be concerned that the Bot will make many mistakes, causing customer dissatisfaction and reflecting poorly on the host company. It may also be more difficult to find problems in the Bot's responses "after the fact" instead of in the middle of a conversation. If some or all of the Bot's answers are subject to ultimate approval by a human being, the opportunity arises for constant upgrading of the quality of the Bot's responses.

Similarly, human beings are often bored by the hum-drum sameness of most of the inquiries in a customer service or other public-facing communications job. Turnover in such jobs is traditionally high, in part because the pay is relatively poor, but also because it is hard to find, train, and retain people who are smart enough to answer the more difficult inquiries, but who are willing to put up with the hum-drum boredom of the average inquiries. Moreover, many mistakes are made by human beings who are tired of answering tedious standard inquiries, and it often takes human beings a great deal of time to answer even simple inquiries.

Some steps have been taken to put more powerful and efficient tools in the hands of human beings, including search engines, shortcuts, standard answers that can be cut and pasted, etc. However, the present invention is the first of its type to present the following unique features: (i) utilizes a Bot; (ii) the Bot operates automatically on input received from the User, without requiring editing or other direction from a human being; (iii) the Bot can either be directed to send the individual response directly to the User or to send it to the human being first, depending upon parameters that can be set by the designer or an administrator; and (iv) if sending the response to the human being, it can be presented in an editable form, such that the human being can send the response to the user exactly as it is, add essential information, change certain aspects of the response, or simply send a different response entirely.

The expense of customer service is very great and rising steadily. In particular, it is expensive to train, support and maintain human customer service providers, whether those agents are located domestically or overseas. Moreover, a very high percentage of the questions answered by customer service providers is repetitive. In this environment what is needed is a method for taking the burden of the relatively simple and repetitive inquiries away from the customer service provider and allowing them to concentrate on more complex inquiries. This maximizes the value of the customer service provider and greatly reduces the cost of customer service.

What is needed is a method and system of using a Bot that will allow the Bot to respond, fully or conditionally, to those inquiries for which it appears to have appropriate responses, leaving the human agent to approve or edit Bot responses as they are sent to him or her and to answer the very complex questions that are better suited to a human intelligence. Such an invention would allow the humans to be better paid to do more consistently interesting work, while the overall cost of customer service could be reduced dramatically and the speed and consistency of responses to user inquiries could be greatly enhanced.

BRIEF SUMMARY OF THE INVENTION

The present invention accomplishes this by combining a Bot with a human being-staffed service desk. The Bot can answer simple queries automatically and/or forward suggested answers to more complex inquiries to the service desk, greatly reducing the burden on the human agent and making useful suggestions for those interactions that require human intervention.

Generally, the present invention is a method and system whereby a Bot directly or indirectly receives an inquiry, acts upon it, and, depending upon how it has been instructed, either (a) provides a suggested response to the service desk where the response can be approved, edited, or disapproved by a human being, or (b) responds to the user directly. The method and system are configured to repeat (or recur) with each new input received from the user.

The method for providing a response to an input entered by a user in a system for autonomously processing the input begins with receiving the input entered by the user. A provisional response to the input is generated. The provisional response is sent to the service desk. If the provisional response is approved, the provisional response is designated as a final response. If the provisional response is edited, the modified response becomes the final response. If the provisional response is disapproved, the provisional response is discarded or ignored and an alternative response is designated as the final response. Lastly, the final response is sent to the user.

Alternatively, a confidence factor may be utilized. If the confidence factor for the input exceeds a certain level, the Bot sends the provisional response directly to the user as the final response.

The computer based system that provides a response to an input entered by a user in a system for autonomously processing the input includes a connection interface, an engine, and a service desk. The engine is configured to receive the input from the user via the connection interface, to generate a provisional response, and to send a final response to the user. Additionally, the engine may be configured to send the provisional response to the user as the final response based on a confidence factor. The service desk is configured to receive the provisional response; to approve the provisional response and designate the provisional response as the final response, edit the provisional response to achieve the final response, or discard the provisional response and designate an alternative response as the final response; and to send the final response to the engine.

BRIEF DESCRIPTION OF THE SEVERAL VIEWS OF THE DRAWINGS

FIGS. 2.1-2.5 illustrate various configurations of Bot processors, front ends, and service desks suitable to the present invention;

FIG. 3.1 illustrates the structures of a Bot processor suitable for the purposes of the present invention;

FIG. 3.2 illustrates the structures of a service desk suitable for the purposes of the present invention;

FIG. 3.3 illustrates a Bot processor and a service desk sharing a connection interface;

FIG. 4.1 illustrates the processing of an input;

FIG. 4.2 illustrates the processing of an input, including the generation and use of a confidence factor;

FIG. 5.1 illustrates one method of generating a confidence factor;

FIG. 5.2 illustrates another method of generating a confidence factor; and

FIG. 5.3 illustrates yet another method of generating a confidence factor.

DETAILED DESCRIPTION OF THE INVENTION

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The term Bot is used throughout this application. For the purposes of the present invention, Bot refers to any program which interacts with a user in some fashion, and should not be assumed to refer only to physically embodied robots.

The present invention is, generally, a structure and a method where a Bot processor 142 is used to recognize an input and forward a response to a service desk 320, where a human being 322 may then (i) approve the response, (ii) edit the response, or (iii) discard the response completely and send a different response. The structure and method are configured to repeat (or recur) with each new input received from the user.

Figure 1:
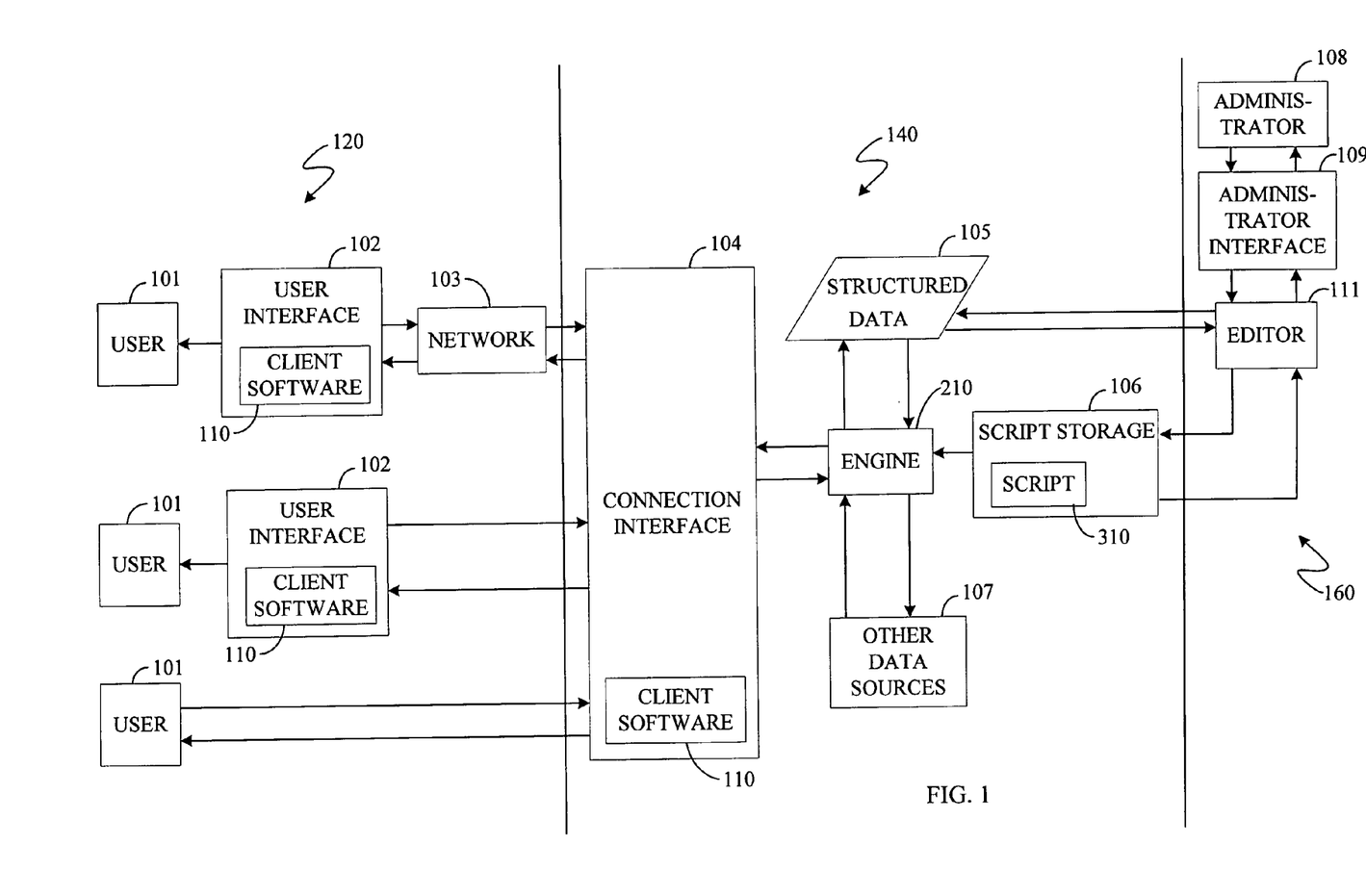
FIG. 1 illustrates a suitable operating environment, with variations, for the purposes of the present invention.
Figure 21:
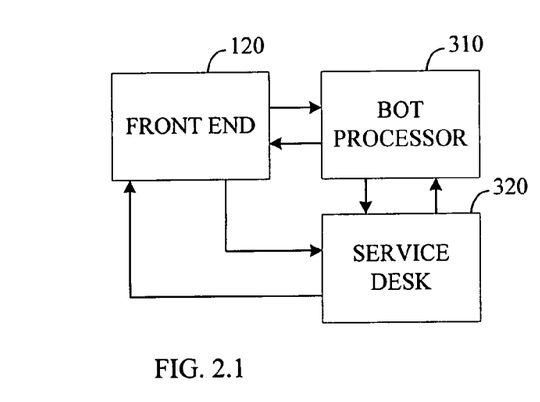

Referring now to FIG. 1, a typical operating environment for the present invention is depicted. The environment can be characterized generally into three sections: a front end section 120; a Bot processing section 140; and an administration section 160. The front end section 120 is generally an environment in which a user 101 interacts with a Bot connection interface 104, possibly via a user interface 102 that may be connected to the Bot connection interface 104 via a network 103. The user interface 102 can be anything capable of receiving human or machine language input, including, without limitation, a computer, a Personal Digital Assistant (PDA), a telephone, or a pager. The user interface 102 will also typically have some form of client software 110 installed to provide a text box, buttons, or other method for the entry of user 101 inputs and some method for providing intelligible responses from the Bot. The network 103 can be any system capable of transmitting such input over any distance, including, without limitation, a local area network (LAN), the Internet, a "wifi" (wireless fidelity), cellular or other wireless data connection, a virtual private network (VPN), or simply a hard wired telephone system. The user 101 can also simply act directly upon the Bot connection interface 104. In such circumstances (as well as in circumstances such as telephony where the user input will not support client software 110) client software 110 will usually be resident in the Bot connection interface 104 to facilitate user 101 interaction. It will be appreciated that many other means of connection to Bot processor section 140 are well known to those skilled in the art and that the present invention should not be limited to any particular aspects of the general operating environment as disclosed herein.

In a common use of Bot technology, the user 101 connects to a site where the user interface 102 includes client software 110. The advantage for the site developer is that the user 101 may have a help or information request that is easily handled via a Bot using the client software 110. It is not uncommon to find sites having a list of FAQ's (Frequently Asked Questions) which serve the purpose of handling very low level user concerns and questions. However, where there are a substantial number of FAQ's, pointing and clicking through web pages becomes an inefficient method of finding the required information, as does searching with a conventional search engine. Bots provide a more efficient method of obtaining information and of handling more advanced questions or interactions with the site.

In the operating environment of this embodiment of the present invention, the Bot connection interface 104 consists of hardware, an operating system, and any application software necessary to support a Bot engine 210 and/or a display 321 and a human being 322, and enable them to receive inputs and send responses in a chosen communications mode. Necessary application software in the Bot connection interface 104 may include an email application, an instant messaging application, an internet relay chat (IRC) application, voice recognition software, or other applications, as necessary, to support the chosen mode or modes of communication between the Bot engine 210, the user 101, and/or the human being 322. Additionally, if utilized, the client software 110, structured data 105, and script storage 106 may all be resident on the Bot connection interface 104, although these may also be hosted on a remote computer and made available to the Bot engine 210 via a network 103 or other connection.

As the user 101 sends inputs, the Bot engine 210 receives the inputs, processes the inputs, and generates responses. Typically, where the user 101 is human, a two way communications dialogue occurs between the user 101 and the Bot engine 210 in that the user 101 may ask questions, make declarative statements, and perform other normal communications patterns that typify modes of human communications. For the purposes of the present invention, "communications" is intended to be a very broad concept. Indeed, suitable communications may be in the form of written or spoken language, graphics, URL's or the like that may be passed to and from a user to an automatic interface program, such as the present invention.

In turn, the Bot engine 210 accepts the inputs generated by the user 101, recognizes the inputs, and generates responses by processing the inputs according to a script or scripts 310 that are typically stored in script storage 106. The scripts 310 contain rules and are typically created at the administration section 160, as necessary or appropriate for the specific use to which the Bot will be put. For example, if the site using the Bot engine 210 is a site for a reseller of personal computers, then the scripts 310 should be designed to handle questions and discussions concerning personal computers and their peripherals. Thus, the administration section 160 will generate the scripts 310 such that the scripts 310 will guide the discussion concerning many computer-related topics. The scripts 310 are then stored for use by the Bot engine 210, or, alternatively, the scripts 310 may be compiled by a compiler and the compiled code incorporated into the engine (see, for example, U.S. Pat. No. 6,532,401). Although this is a preferred embodiment of the invention, those skilled in the art will readily understand that the purposes of the present invention are accomplished by any engine 210 that can recognize an input and generate a response.

The administration section 160 is not required for the present invention, but is typically used to set up, maintain, and administer the Bot processing section 140. The administration section 160 typically consists of an administrator 108, an administrator interface 109, and an editor 111. The administrator 108 is the human being who creates the scripts 310 that govern the behavior of the Bot engine 210. Typically, this human being accomplishes this task through the use of the administrator interface 109 that has a text box or boxes or other entry points for the input of text (or a pattern or patterns) or programming regarding the recognition of a certain input, as well as the response or responses that should be associated with that input. The administrator interface 109 may also provide various tools to facilitate the process of inputting the text or programming in an organized and efficient way. The editor 111 takes the text or programming provided by the administrator and associates them with the appropriate response or responses. The administrator interface 109 and the editor 111 may be created as a single unit or may be designed to reside in separate computers. It will be appreciated by those skilled in the art that the scripts 310 can be written by human administrators or by automated or partially automated script creation tools and that the present invention should not be limited to scripts written by humans or otherwise.

Although FIG. 1 gives a general description of various operating environments in which Bots may exist, it will be appreciated that many other operating environments are obvious to those skilled in the art and that the scope of the present invention should not be so limited to the exemplary descriptions as given above.

Figure 32:
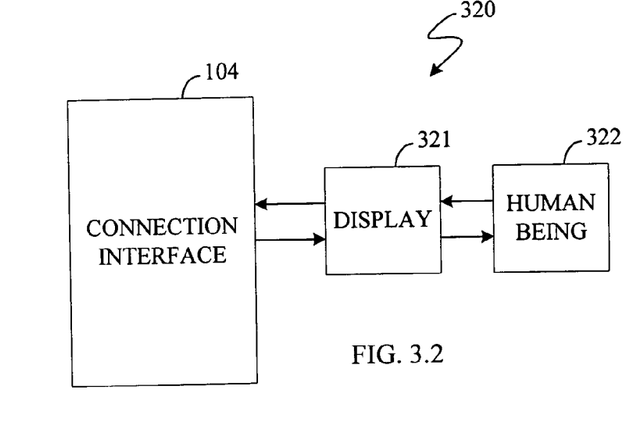
Figure 33:
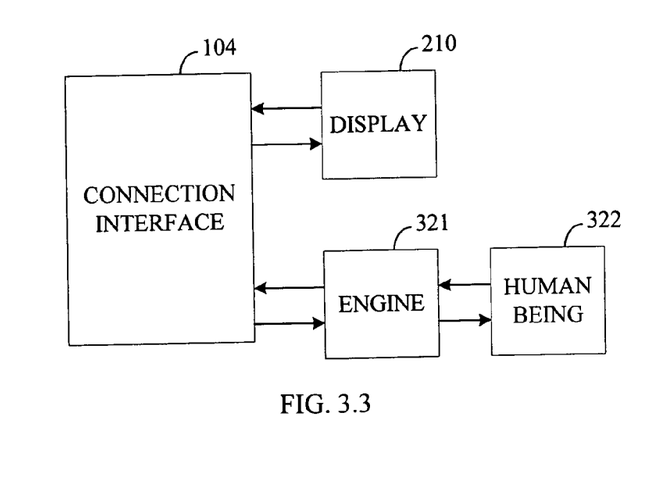

In the present invention, the bot processor 142 of the bot processor section 140 is used to recognize the input and, as appropriate, forward the response to the front end section 120 or to the service desk 320, where the human being 322 can then (i) approve the response, (ii) edit the response, or (iii) discard the response completely and send a different response to the front end section 120. In a preferred embodiment, the process recurs for each input from the user. The phrase "service desk" 320 is used to generally mean the human being 322, the display 321, and the Bot connection interface 104, as depicted in FIG. 3.2.

Referring to FIGS. 2.1-2.5, the methods by which the front end section 120, the Bot processor 142, and the service desk 320 can be connected will now be described. In FIG. 2.1 the front end section 120, the Bot processor 142, and the service desk 320 each connect to one another directly. In FIG. 2.2, the front end section 120, Bot processor 142, and the service desk 320 all connect via a form of a message distributor 221. The message distributor 221 is any of the many structures that will be familiar to those skilled in the art, the purpose of which is to route communications appropriately between the other structures. Examples of a message distributor 221 include routers, load balancers, filters, chat rooms, etc. In FIG. 2.3, the Bot processor 142 is connected between the front end section 120 and the service desk 320, so that all communication goes through the Bot processor 142. Similarly, in FIG. 2.4, the service desk 320 is connected between the front end section 120 and the Bot processor 142, so that all communications are routed through the service desk 320. Finally, in FIG. 2.5, the front end section 120 is connected between the Bot processor 142 and the service desk 320, such that all communications are routed through the front end section 120.

Figure 22:
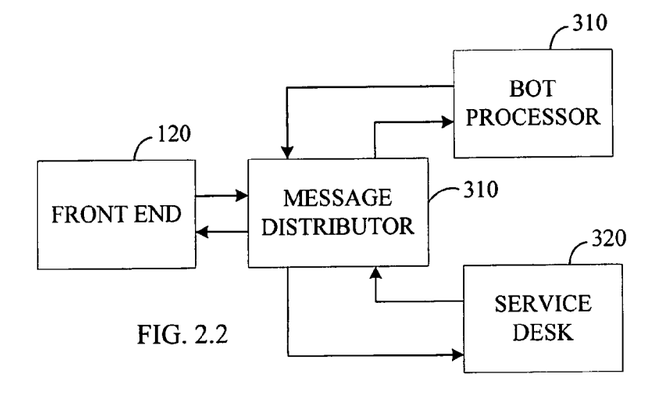
Figure 23:
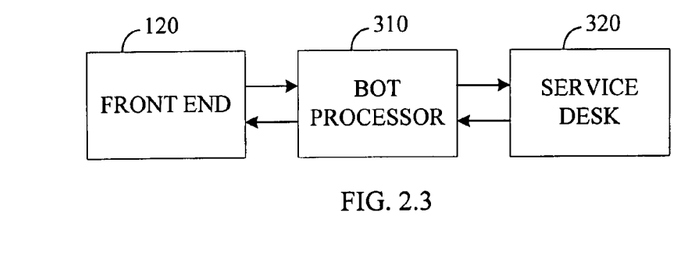
Figure 24:
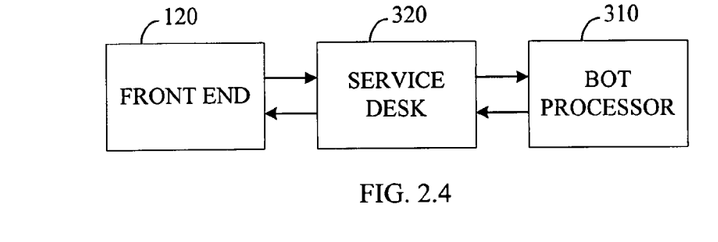
Figure 25:
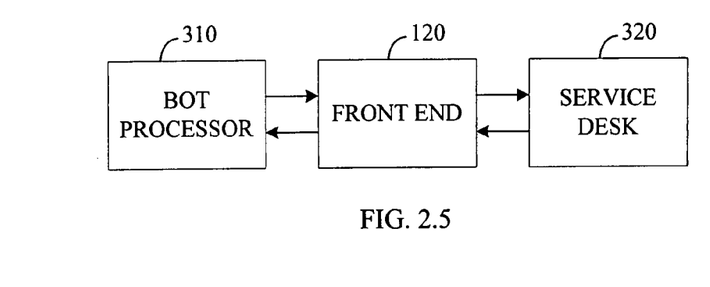
Figure 31:
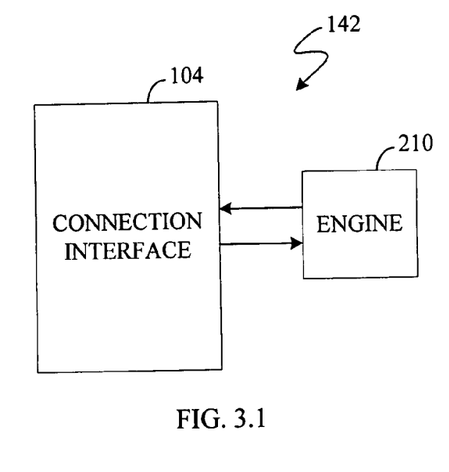

Those skilled in the art will understand that it is also possible to use combinations of the above methodologies within the scope of the present invention and that the purposes and effectiveness of the present invention are not dependent upon any particular configuration of these elements. For example, it might be desirable to have the message distributor 221 for most communication, as in FIG. 2.2, but still have the Bot processor 142 and the service desk 320 send any responses directly to the front end section 120, as in FIG. 2.5. It is also the intent of the present invention to support multiple instances of each structure. For example, the message distributor 221 in FIG. 2.2 could support hundreds of service desks 320, all supported by the one or more Bot processors 142 attached to the message distributor 221. Multiple front end sections 120 could send messages to multiple service desks 320, each located in remote locations, and each supported by their own Bot processors 142. As those skilled in the art will understand, many other methodologies are possible within the scope of the present invention.

As emphasized in the discussion of the operating environment, the present invention is not dependent upon the front end section 120, the Bot processor 142, and the service desk 320 operating within any one mode of communication or in any specific software or hardware environment. Application software used with the Bot connection interface 104 could include an email application, an instant messaging application, an internet relay chat (IRC) application, voice recognition software, or other applications, as necessary, to support the chosen mode or modes of communication between the Bot engine 210, the front end section 120, and the service desk 320. For the purposes of the present invention, "communications" is intended to be a broad concept. Indeed, suitable communications may be in the form of written or spoken language, graphics, URL's, or the like that may be passed to and from a user and an automatic interface program, such as the present invention.

The structure of the Bot processor 142 and the service desk 320 will now be described. As discussed above, FIG. 1 depicts the general operating environment and possible structures for the Bot processor section 140. For the purposes of the present invention, however, the only required elements of the Bot processor 142 are the Bot engine 210 and the Bot connection interface 104, as depicted in FIG. 3.1. The structures of the service desk 320 are depicted in FIG. 3.2 and include the Bot connection interface 104, the display 321, and the human being 322. FIG. 3.3 depicts the Bot processor 142 and the service desk 320 sharing the Bot connection interface 104, as possible within the scope of the present invention. Although the present invention is discussed, for purposes of clarity, in terms of the example of web-based customer service, those skilled in the art will readily understand that the human being 322 may be supported by the present invention in many different environments from telephony to wireless messaging to answering questions at a live presentation.

Figure 41:
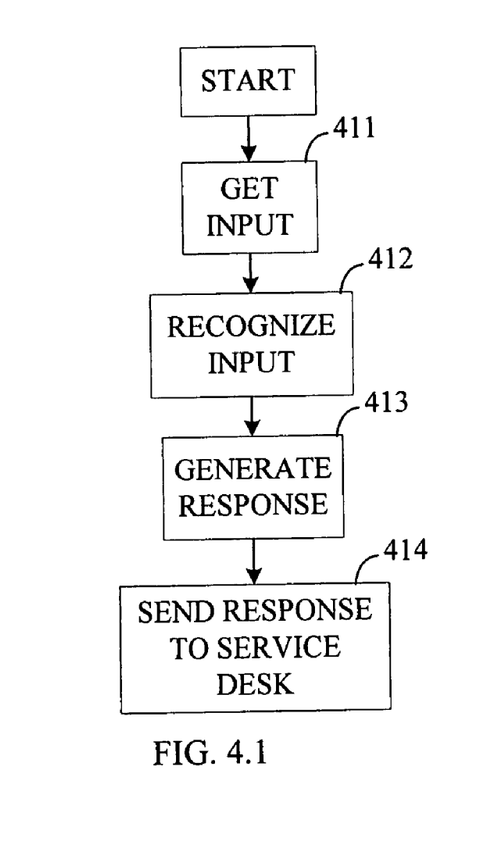

Referring to FIG. 4.1, the processing of input will now be described. First, the Bot processor 142 gets the input in step 411 through the front end section 120 sending the input to the Bot processor 142. Preferably, the Bot engine 210 then recognizes the input in step 412. Next, a provisional response is generated in step 413. The provisional response is then sent to the service desk 320 in step 414. At the service desk 320, the provisional response is approved, edited, or disapproved by the human being 322. If the provisional response is approved, it is designated as a final response. If the provisional response is edited, the modified response is designated as the final response. If the provisional response is disapproved, the provisional response is discarded (or ignored) and an alternative response is designated as the final response. Other than the step 412 of recognizing input, which must occur as an activity of the Bot engine 210, all other activities can be located within the Bot processor 142, the front end section 120, the service desk 320, or in another intermediary or ancillary structure according the present invention.

Step 413 of generating the provisional response may be initiated by the human being 322, in any suitable manner. The human being 322 may also initiate step 413 once a criteria is triggered. Additionally, once the criteria is triggered (or another criteria), the Bot engine may automatically initiate the generation of the provisional response. The criteria may be an external or internal event, a factor, a setting, etc. which is capable of acting as a trigger. For example, the criteria may be the passage of a specified period of time, a certain level of load on the system, a specific configuration setting, the time of day, etc. The criteria may be triggered before or after the input is received. It will be apparent to those skilled in the art that the use of criteria may be configured to the desired outcome or handling of the input.

For example, after the input is received by the Bot processor 142, a specified time period, for example, 30 seconds, may begin to run. During this time period, the human being 322 may prompt the generation of the provisional response. If the human being 322 fails to prompt the generation of the provisional response, the Bot engine 210 may automatically generate the provisional response.

Figure 42:
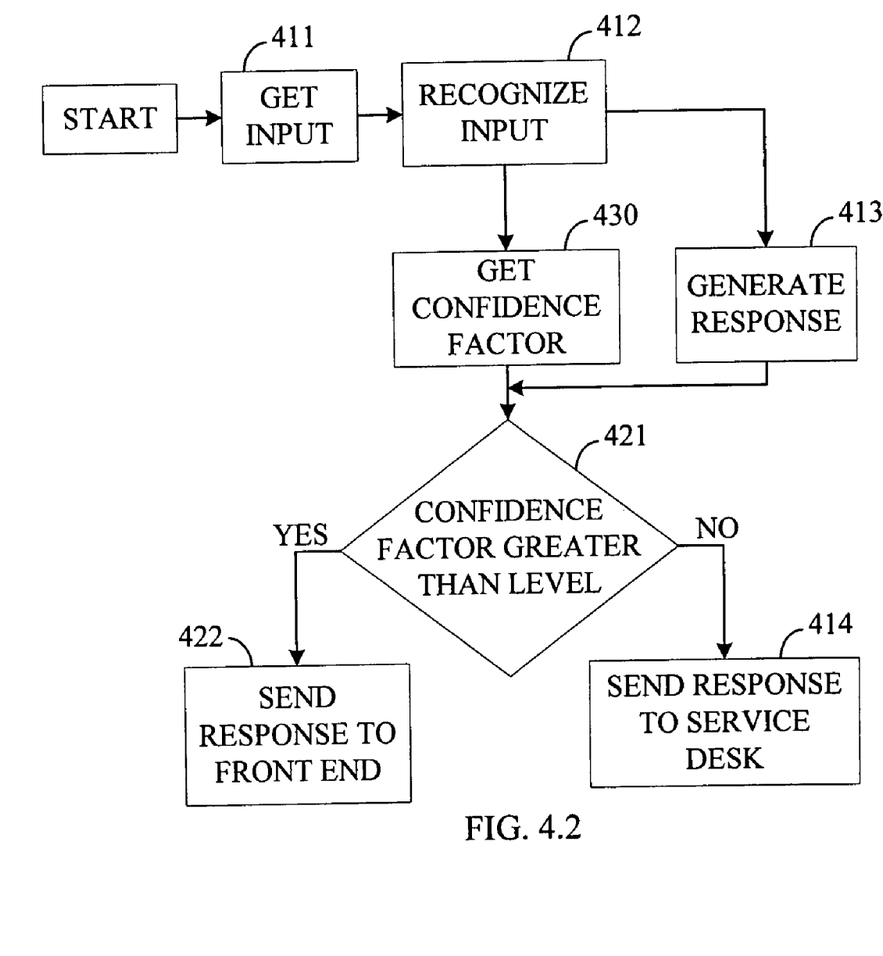
Figure 51:
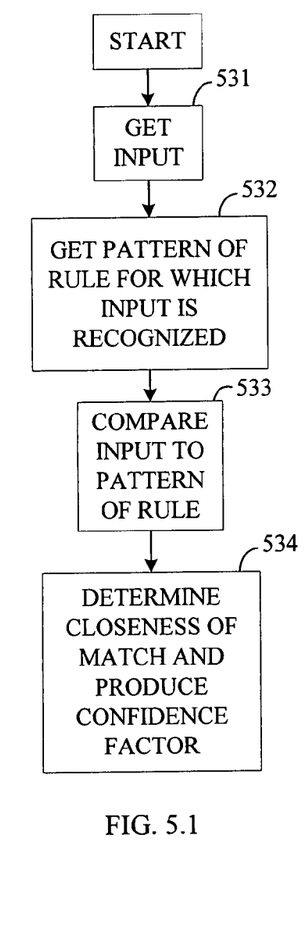

Referring to FIG. 4.2, the generation and use of a confidence factor will now be described. As used herein a confidence factor means any metric that can be used to determine whether a response is best sent to the service desk 320 or sent to the front end section 120. First, the Bot processor 142 gets the input in step 411 through the front end section 120 sending the input to the Bot processor 142. The Bot engine 210 then recognizes the input in step 412. Next, a response is generated in step 413. Additionally, a confidence factor is retrieved in step 430. Depending upon the preferences of the designer, either the confidence factor or the response may be generated first or they may be generated simultaneously. If the confidence factor is greater than a designated level in step 421, the response is sent to the front end section 120 in step 422. If not, the response is sent to the service desk 320 in step 414. Other than the step 412 of recognizing input, which must occur as an activity of the Bot engine 210, all other activities can be located within the Bot processor 142, the front end section 120, the service desk 320, or in another intermediary or ancillary structure according the present invention.

Referring to FIGS. 5.1-5.3, variant methods for the generation of the confidence factor will now be described. In FIG. 5.1, the generation of the confidence factor is based upon the similarity of the input to the pattern of the rule for which the input is recognized. Step 430 (FIG. 4.2) of retrieving the confidence factor includes the steps of getting the input in step 531 and getting the pattern of the rule for which the input is recognized in step 532. Steps 531 and 532 may occur in any order or simultaneously. Alternatively, step 531 may be omitted if the input is still available from step 411. Next, in step 533 the input is compared to the pattern, using whatever methodology is designated. For example, the confidence factor may be based upon the number of words that are common (or even) identical between the input and the pattern; the number of letters that are common; the number of "wild cards," synonyms, or regular expressions used to match the input and the pattern; etc. It will be obvious to those skilled in the art that many different methodologies may be used within the scope of the present invention. Finally, step 534 determines the closeness of the match between the input and the pattern and produces the confidence factor to be sent to step 421, FIG. 4.2.

Figure 52:
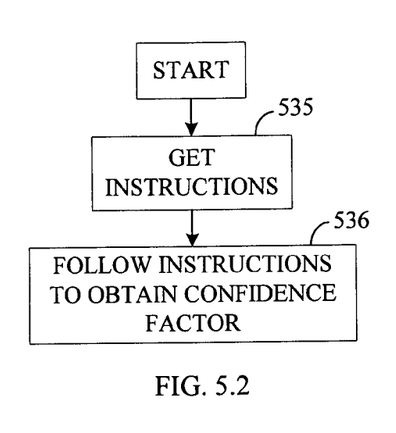

FIG. 5.2 depicts a more general method of obtaining the confidence factor based upon predetermined instructions in the form of a code, a tag, and/or an instruction set. In this example, step 430 of retrieving the confidence factor starts by getting instructions in step 535. The instructions may be specific to the rule for which the input was recognized; they may be general instructions based upon the time of day, message traffic density, or other external circumstances; or they may be a set of instructions that cause the step 430 of retrieving the confidence factor to arrive at a result based upon some tagging or ordering of the rules or based upon some metadata or code contained in the rules or elsewhere. As will be apparent to those skilled in the art, the instruction could be a combination of any of these factors, and could even include as a factor the result of the processes described in FIG. 4.2 within the scope of the present invention. The instructions are followed to obtain the confidence factor in step 536.

Figure 53:
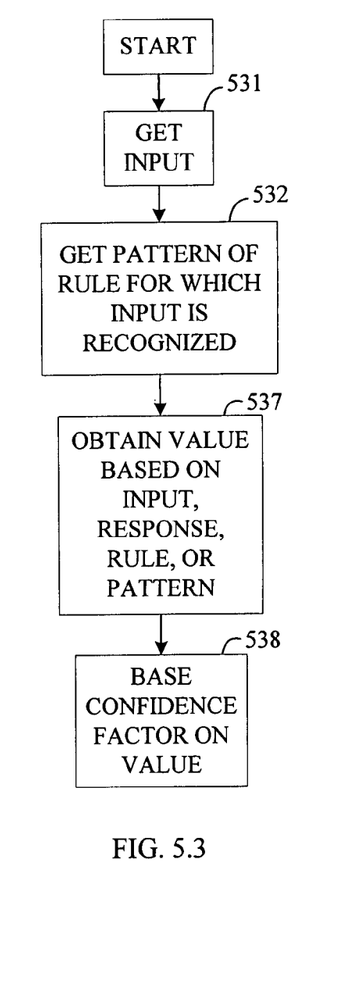

In FIG. 5.3, the generation of the confidence factor is based upon a the input, the response, the rule, or the input in isolation or in combination. A static value (or constant) may be assigned to the input, the provisional response, the rule, or the pattern. Alternatively, an algorithm may be assigned to the input, the provisional response, the rule, or the pattern, respectively. It is the value, static or obtained through an algorithm, that is the basis for the confidence factor. Step 430 (FIG. 4.2) of retrieving the confidence factor includes the steps of getting the input in step 531 and getting the pattern of the rule for which the input is recognized in step 532. Steps 531 and 532 may occur in any order or simultaneously. Alternatively, step 431 may be omitted if the input is still available from step 411. Next, in step 537 a value is obtained based on the input, the provisional response, the rule, or the pattern. It will be obvious to those skilled in the art that many different methodologies may be used within the scope of the present invention. Finally, step 538 produces the confidence factor to be sent to step 421, FIG. 4.2.

It will be understood by those skilled in the art that while the foregoing description sets forth in detail preferred embodiments of the present invention, modifications, additions, and changes might be made thereto without departing from the spirit and scope of the invention.

The invention claimed is:

1. A computer system that provides a response to an input entered by a user in a system for autonomously processing the input, comprising:
    a service desk comprised of one or more agents;
    a connection interface;
    an engine configured to:
        receive the input from the user via the connection interface;
        generate a first provisional response in response to a criteria being triggered, wherein the criteria is a load on the system as defined by an amount of the one or more agents available to communicate with the user and transmit the first provisional response to the user;
        generate a second provisional response if the first provisional response has not been generated;
        recognize the input based upon a rule;
        retrieve a pattern of the rule that most closely matches the input, wherein the closeness of matching is based upon a number of words that are common between the input and the pattern;
        obtain a confidence factor of the closeness of matching by:
            getting instructions relating to message traffic density, wherein message traffic density is defined as the amount of messages routed within the system; and
            getting code and executing the code to compare the pattern to the input;
        compare the confidence factor to a designated level and;
        designate the second provisional response as a final response when the confidence factor is greater than the designated level and send the final response to the user;
        transmit the second provisional response to the service desk when the confidence factor is less than the designated level, wherein the service desk is configured to:
            receive the second provisional response;
            receive input from the one or more agents, wherein the agent input causes the engine to:
                designate that the second provisional response is the final response; or
                edit the second provisional response into the final response; or
                discard the second provisional response and designate an alternative response as the final response;
            send the final response to the engine; and
            transmit the final response to the user;
    a front end section connected to the connection interface;
    a bot processor including the engine and the connection interface, wherein the service desk is connected between the front end section and the bot processor; and
    a message distributor interconnecting the front end section, the bot processor, and the service desk, wherein the message distributor routes the messages therebetween.

2. The computer system according to claim 1, wherein the service desk further includes a display.

3. The computer system according to claim 1, wherein the criteria further includes a specified time period.

4. The computer system according to claim 1, wherein the criteria further includes an event.

5. The computer system according to claim 1, wherein the criteria further includes a system setting.

6. The computer system according to claim 1, wherein determining the closeness of matching is further based upon a number of letters that are common between the input and the pattern.

7. The computer system according to claim 1, wherein determining the closeness of matching is further based upon a number of synonyms that are common between the input and the pattern.

8. The computer system according to claim 1, wherein determining the closeness of matching is further based upon a number of regular expressions that are common between the input and the pattern.

9. The computer system according to claim 1, wherein the step of getting the confidence factor further includes the step of producing the confidence factor based upon a value assigned to the input, the response, the rule, or the pattern.

10. The computer system according to claim 9, wherein the value is a constant.

11. The computer system according to claim 9, wherein the value is determined by an algorithm assigned to the input, the response, the rule, or the pattern, respectively.

12. The computer system according to claim 9, wherein more than one value is used in producing the confidence factor.

* * * * *